United States Patent [19]

Ikenoue et al.

[11] 4,210,958
[45] Jul. 1, 1980

[54] DC-DC CONVERTER OUTPUT STABILIZING DEVICE

[75] Inventors: Tsuneo Ikenoue, 14-6, Ichiban-cho 1-chome, Sendai-shi, Miyagi-ken, Japan; Mitsugi Suzuki; Shin-Yng Liu, both of Sendai, Japan

[73] Assignees: Tsuneo Ikenoue; Tōhoku Ricoh, Ltd.; Tōhoku Musen Denki Co., Ltd., all of Miyagi, Japan

[21] Appl. No.: 954,455

[22] Filed: Oct. 25, 1978

[51] Int. Cl.² ........................................ H02M 3/335
[52] U.S. Cl. ............................. 363/124; 323/DIG. 1
[58] Field of Search ............ 307/252 J; 323/DIG. 1; 363/20, 21, 124

[56] References Cited

U.S. PATENT DOCUMENTS

| | | | |
|---|---|---|---|
| 3,383,584 | 5/1968 | Atherton | 323/DIG. 1 |
| 3,564,393 | 2/1971 | Williamson | 323/DIG. 1 |
| 3,590,361 | 6/1971 | Bishop et al. | 363/21 |

*Primary Examiner*—William M. Shoop
*Attorney, Agent, or Firm*—Burgess, Ryan and Wayne

[57] ABSTRACT

A device for stabilizing the output of a DC-DC converter of the type wherein smoothed direct current is supplied to a load through a series combination of a switching element which is controlled by a train of pulses from a pulse oscillator and an inductor. An astable multivibrator and a differential amplifier are connected in parallel with a DC source. The switching element is controlled by a train of pulses from the astable multivibrator. The differential amplifier compares the smoothed output from a smoothing circuit with a reference voltage and the two outputs therefrom are applied to two time constant circuits of the astable multivibrator so as to control the relative variation between the discharge times thereof.

2 Claims, 5 Drawing Figures

DC-DC CONVERTER OUTPUT STABILIZING DEVICE

BACKGROUND OF THE INVENTION

The present invention relates to a device for stabilizing a DC-DC converter.

In the prior art DC-DC converters of the type wherein direct current is supplied to a load through a series combination of a switching element and an inductor, the ratio of the ON time to the OFF time of the switching element is not equal to the pulse duty factor of control pulses applied to the switching element because of the storage time thereof. As a result, precise control of the output of the DC-DC converter becomes difficult with increase in the frequency of the control pulses. The only remedy so far proposed is not to increase the frequency of the control pulses beyond a certain limit, but the control of the DC-DC converter to a desired degree of accuracy is still impossible.

SUMMARY OF THE INVENTION:

One of the objects of the present invention is therefore to provide a device capable of the fine stabilization of the output of a DC-DC converter by the precise control of ON-OFF operation of a switching element in response to the variation in input voltage and output voltage even at a high frequency.

In the present invention, an astable multivibrator is used as a pulse oscillator which generates a train of pulses controlling a switching element. A differential amplifier is additionally used for the comparison between the output voltage and a reference voltage. In response to the two outputs of the differential amplifier, the relative difference between discharge times of two time constant circuits of the astable multivibrator is varied, whereby the ON-OFF operation of the switching element may be accurately controlled.

BRIEF DESCRIPTION OF THE DRAWINGS

The same reference numerals are used to designate similar parts throughout the figures.

PRIOR ART OF THE INVENTION

Figure 1:
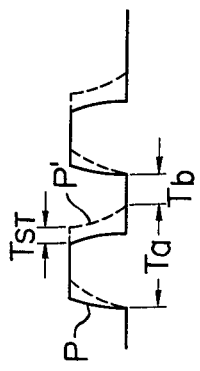
FIG. 1 shows the waveform of the control pulse applied to a switching element of a DC-DC converter and the waveform of the output pulse thereof.

Referring to FIG. 1, in response to the control or driving pulse P indicated by solid lines, a switching element responds as indicated by the waveform P' indicated by dashed lines. The failure of the switching element to respond to the trailing edge of the driving pulse P is due to the storage time Tst. Thus, though the ratio of the ON time to the OFF time of the switching element varies, the switching element does not follow the control pulse P faithfully. In other words, the ratio of the ON time to the OFF time of the output pulse P' of the switching element does not follow that of the control pulse P. Especially when the pulse repetition rate of the pulse oscillator becomes higher, the response of the switching element will be delayed.

PREFERRED EMBODIMENTS OF THE INVENTION

Figure 2:
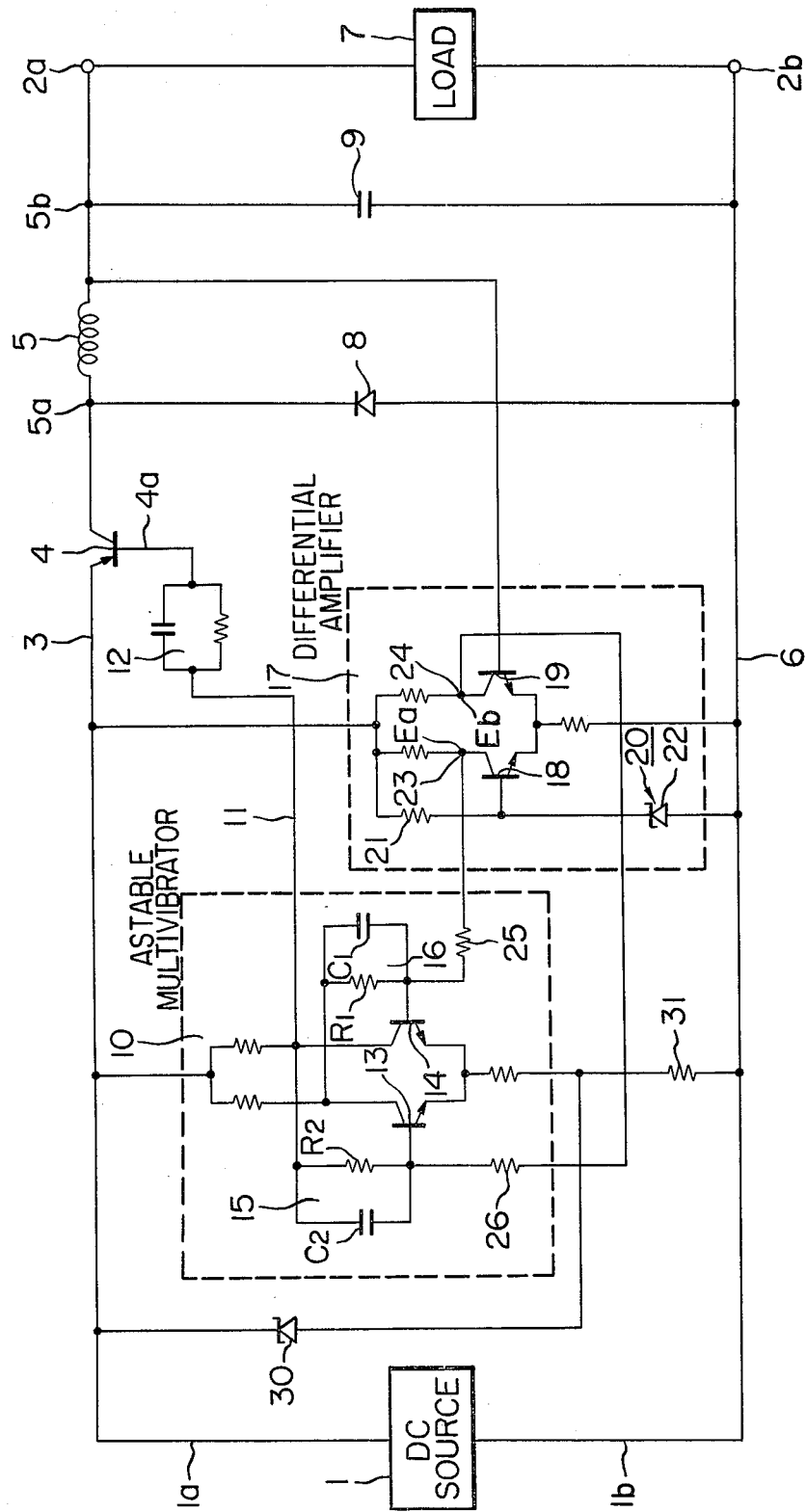
FIG. 2 is a circuit diagram of a first embodiment of the present invention.

FIG. 2 shows the circuit diagram of the first embodiment of the present invention. A series combination of a switching element 4 such as a transistor and an inductor 5 are interconnected through a line 3 between one terminal 1a of a DC source 1 and an output terminal 2a whereas the other terminal 1b of the DC source 1 is connected through a line 6 to the other output terminal 2b. A load 7 is connected between the output terminals 2a and 2b. The input 5a of the inductor 5 is connected through a diode 8 to the line 6 whereas the output 5b thereof is connected through a smoothing capacitor 9 to the line 6.

As astable multivibrator generally indicated by the reference numeral 10 is connected in parallel with the DC source 1, and the output terminal 11 thereof is connected through a RC coupling circuit 12 to a control circuit 4a for the switching element 4. The multivibrator 10 includes two n-p-n transistors 13 and 14 and two time constant circuits 15 and 16. One end of the first time constant circuit 15 is connected to the base of the first transistor 13 whereas the other end thereof is connected to the collector of the second transistor 14. In like manner one end of the second time constant circuit 16 is connected to the base of the second transistor 14 whereas the other ends thereof is connected to the collector of the first transistor 13.

The DC-DC converter output stabilizing device further includes a differential amplifier 17 connected in parallel with the DC source 1. It includes first and second transistors 18 and 19. The base of the first transistor 18 is connected through a reference voltage source 20 to the line 6 while the base of the second transistor 19 is connected to the output terminal 2a. The reference voltage source 20 comprises a series combination of a resistor 21 and a zener diode 22 connected in parallel with the DC source 1. The output terminals 23 and 24; that is the collectors of the transistors 18 and 19 are connected through resistors 25 and 26, respectively, to the bases, respectively, of the transistors 13 and 14 of the astable multivibrator 10; that is, the ends of the time constant circuits 15 and 16.

Figure 3:
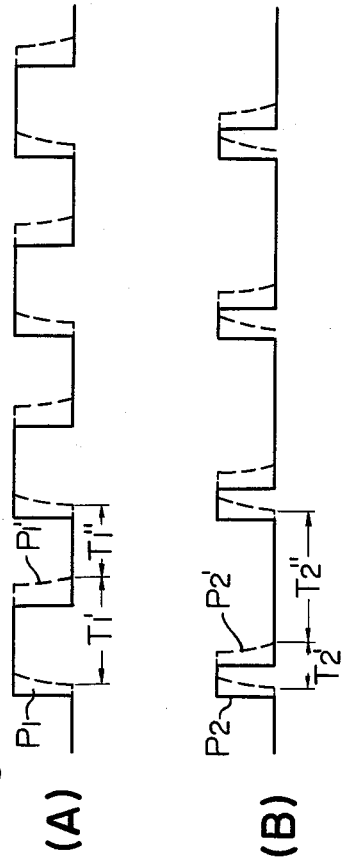
FIG. 3 shows the waveforms of the control pulses applied to the switching element and the output pulses therefrom.

The time constants of the circuits 15 and 16 may be varied depending upon the purposes of the operation to be carried out, but for the sake of simplifying the explanation, it is assumed that $C_1 = C_2$, and $R_1 = R_2$ When the voltage across the load 7; that is, the voltage between the output terminals 2a and 2b equals the reference voltage, the output voltages Ea and Eb at the output terminals 23 and 24 of the differential amplifier 17 are equal to each other and are applied to the time constant circuits 15 and 16 of the astable multivibrator 10. As a result, the multivibrator 10 is caused to oscillate at a frequency which is dependent upon the time constant $C_1 R_1 = C_2 R_2$ so that the rectangular pulse waveform $P_1$ as shown in FIG. 3A is applied to the control electrode 4a of the switching element 4. The switching element 4 responds to the output pulse $P_1$ from the multivibrator 10 as indicated by the dashed lines $P_1'$ in FIG. 3A.

When the DC source voltage and/or the load 7 vary so that the difference between the outputs Ea and Eb of the differential amplifier 17 increases, the base voltage of the second transistor 19 thereof increases, resulting in $(Ea+\Delta E)$ at the output terminal 23 and $(Eb-\Delta E)$ at the output terminal 24. Consequently the time constant of the second time constant circuit 16 increases while that of the first circuit 15 decreases so that a train of pulses $P_2$ as shown in FIG. 3B is applied to the control electrode 4a of the switching element 4. It should be noted that the pulse duration and the pulse spacing of this pulse trains are different opposed to the pulse train shown in FIG. 3A where they are same. The switching element 4 responds as indicated by the dashed lines $P_2'$ in FIG. 3B. The conduction time ratio which is defined by $T_2'/(T_2'+T_2'')$ of the switching element 4 decreases, resulting in the corresponding decrease in power supply. As a consequence, the supply voltage immediately follows the reference voltage.

When the output voltage drops, the output voltage at the terminal 23 is $(Ea-\Delta E)$ while the output voltage at the output terminal 24 is $(Eb+\Delta E)$ in the differential amplifier 17. Consequently the time constant of the first time constant circuit 15 increases while that of the second circuit 16 decreases so that a train of pulses $P_3$ shown in FIG. 3C is applied to the control electrode 4a of the switching element 4. It should be noted that the pulse duration is considerably longer than the pulse spacing in the pulse train shown in FIG. 3C. The switching element 4 responds as indicated by the dashed lines $P_3'$ in FIG. 3C. The conduction time ratio which is defined as $T_3'/(T_3'+T_3'')$ of the switching element 4 becomes higher. The supply power is increased and the output voltage immediately returns to the level of the reference voltage.

So far it has been assumed that the frequency of the astable multivibrator 10 remains unchanged independently of the variation $\Delta E$, but in practice the frequency of the astable multivibrators tends to drop with increase in $\Delta E$. Furthermore the frequency rises with increase in $(Ea+Eb/2)$ and vice versa. Therefore Ea and Eb are determined depending upon a desired operating frequency of the astable multivibrator 10.

So far it has been assumed that the time constants $C_1R_1$ and $C_2R_2$ of the first and second time constant circuits 15 and 16 of the astable multivibrator 10 be the same, but in general it is preferable that they are different ($C_1R_1 \gtrless C_2R_2$) in practical operations.

It should be noted that one of the most important features of the present invention is the interconnection between the astable multivibrator 10 and the differential amplifier 17. In FIG. 2, the sum of the collector currents of the transistors 18 and 19 of the differential amplifier 17 remains unchanged unless the inputs to the transistors 18 and 19 differ excessively. In the mathematical expression, $$E_{1a}-(E_{23}+E_{24})/2 = \text{constant}$$

where $E_{23}$ and $E_{24}$ are the output voltages at the output terminals 23 and 24, respectively, and $E_{1a}$ is the supply voltage.

Since the astable multivibrator 10 is connected to the reference voltage source 20 which consists of the resistor 21 and the zener diode 22 and supplies a stabilized constant reference voltage, the value $(E_{23}+E_{24})/2$ is always constant and is independent of the difference $(E_{1a}-E_{1b})$ where $E_{1b}$ is the ground voltage.

Figure 4:
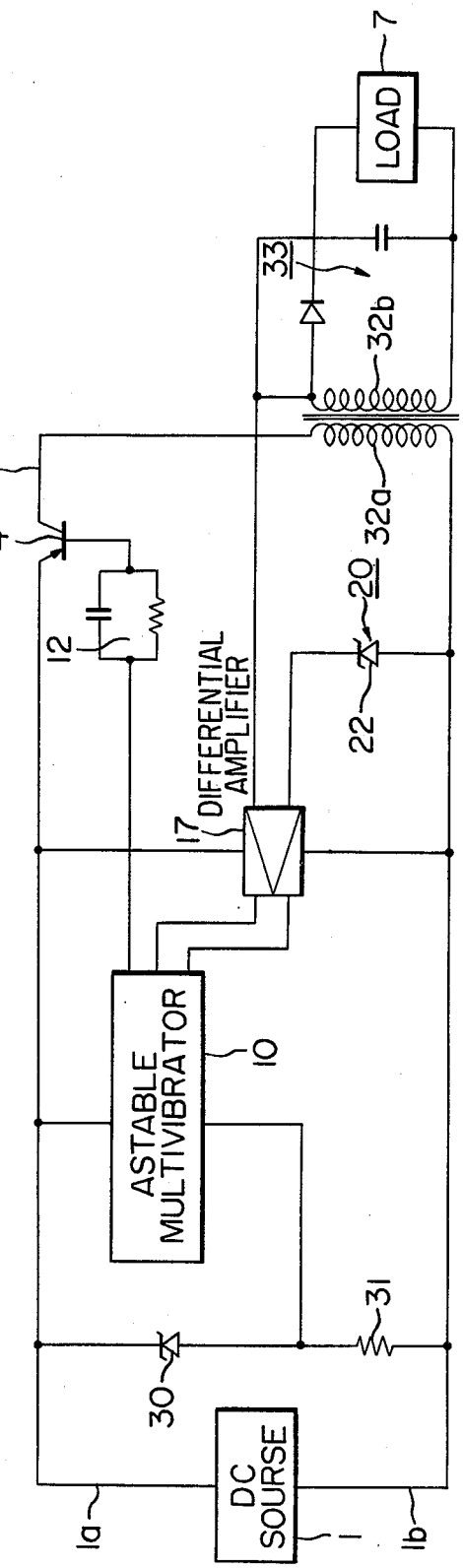
FIGS. 4, 5 and 5A are circuit diagrams of second, third and fourth embodiments, respectively, of the present invention.

As the switching element 4 is turned on and off the inductor 5 stores and discharges DC power. Instead of the inductor 5, a transformer 32 as shown in FIG. 4 may be used. That is, the primary winding 32a of the transformer 32 is connected to the switching element 4 while the secondary winding 32b thereof is connected through a rectifier 33 to the load 7.

Figure 5:
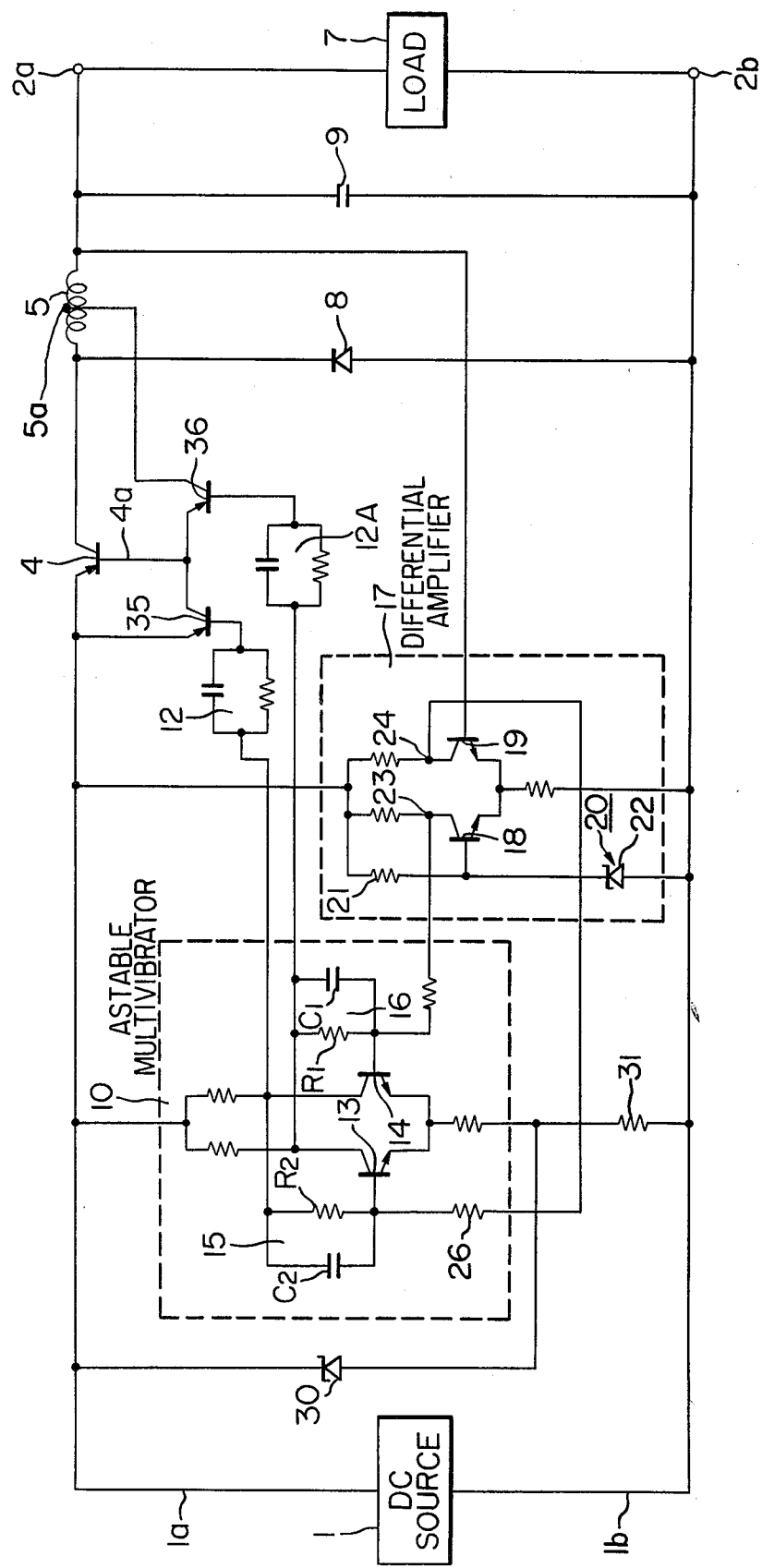
Figure 5A:
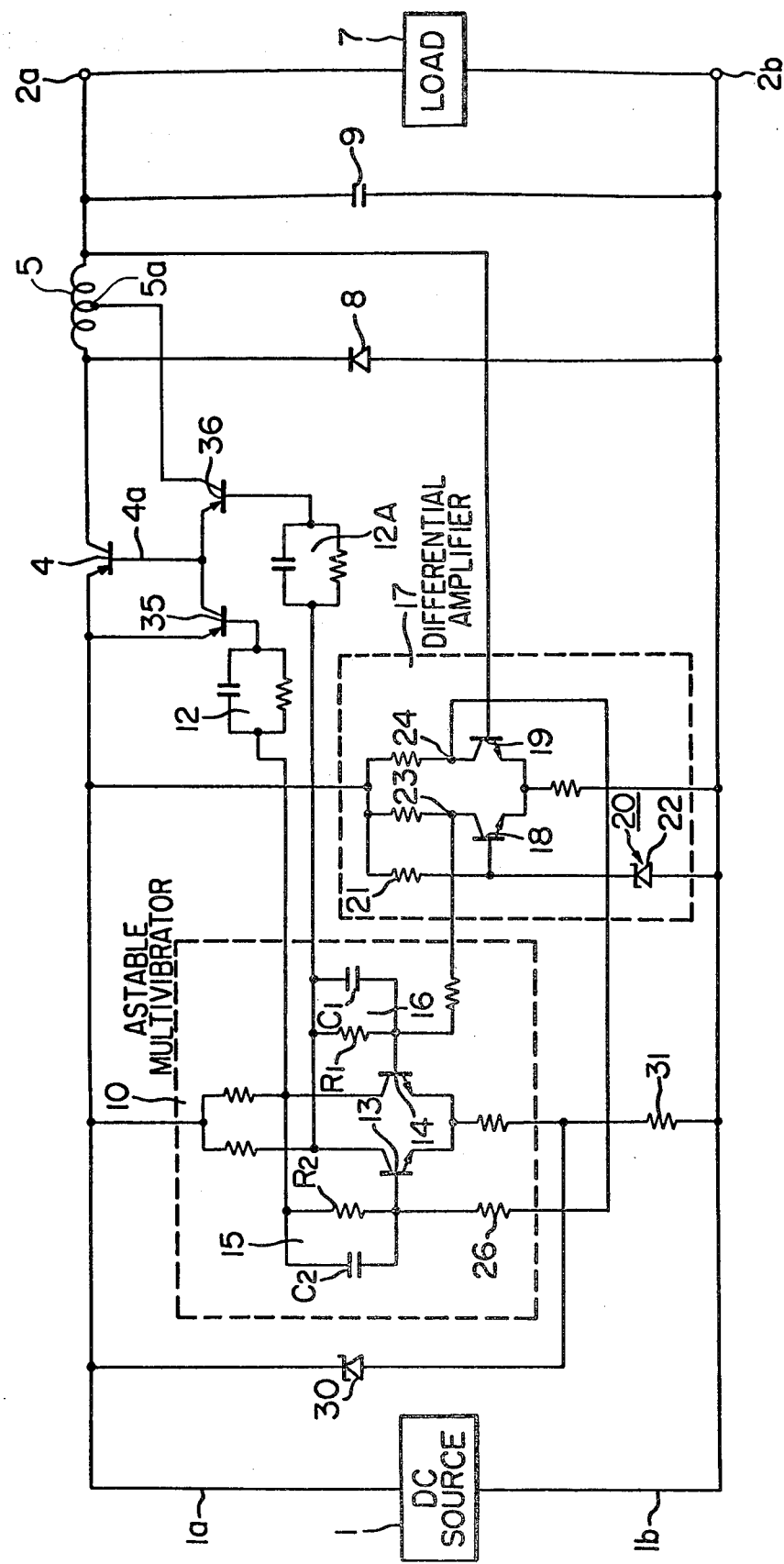

It is apparent that the shorter the storage time Tst, the better is the response of the switching element 4 and the more is the limitation of the output. The device shown in FIG. 5 is therefore designed to minimize the storage time Tst. The base of the transistor or the switching element 4 is connected to the junction between the collector of a transistor 35 and the emitter of a transistor 36. The emitter of the transistor 35 is connected to the input or the emitter of the switching element 4 and the collector of the transistor 36 is connected to the output or the collector of the switching element 4 or to the center tap 5A of the inductor 5 (see FIG. 5A). The collectors of the transistors 13 and 14 of the astable multivibrator 10 are connected through the coupling circuits 12A and 12 to the bases, respectively, of the transistors 36 and 35.

Next the mode of operation will be described. It is assumed that initially the transistor 36 is ON, the transistor 35 is OFF and the switching element 4 is ON. When the transistor 36 is turned off while the transducer 35 is turned on, the voltage at the input of the switching element 4 is applied to the control electrode 4a thereof so that the switching element 4 is forced to turn off. As a result, the storage time Tst may be considerably minimized so that the response of the switching element 4 may be remarkably improved.

Instead of the transistors 4, 35 and 36, field effect transistors or vacuum tubes may of course be used.

What is claimed is:

1. A DC-DC converter comprising:
   a DC voltage source;
   a series combination of a switching element having a control electrode, an input electrode and an output electrode, and an inductor connected in series with said DC voltage source;
   a series combination of two transistors, the junction between said transistors being connected to said control electrode, and one end of said series combination of two transistors being connected to said input electrode;
   a filter circuit for supplying direct current to a load, the switching element being controlled in response to a train of pulses applied to the control electrode thereof so as to control the output voltage from said filter circuit;
   an astable multivibrator connected in parallel with said DC voltage source and having two time constant circuits;
   a constant voltage circuit connected in parallel with said astable multivibrator, one common terminal of said parallel arrangement being connected to a terminal of said DC voltage source;
   a differential amplifier connected in parallel with said DC voltage source for comparing the output from the filter circuit with a reference voltage and providing two oppositely phased control signals, the differential amplifier being connected to apply said control signals to vary the relative discharge times of said time constant circuits of said astable multivibrator, the other end of said series combination of two transistors being connected to the output electrode of said switching element, the control electrodes of said two transistors being respectively connected through resistance-capacitance coupling circuits to the output circuits of said astable multivibrator.

2. A DC-DC converter comprising:

a DC voltage source;

a series combination of a switching element having a control electrode, an input electrode and an output electrode, and an inductor connected in series with said DC voltage source;

a series combination of two transistors, the junction between said transistors being connected to said control electrode, and one end of said series combination of two transistors being connected to said input electrode;

a filter circuit for supplying direct current to a load, the switching element being controlled in response to a train of pulses applied to the control electrode thereof so as to control the output voltage from said filter circuit;

an astable multivibrator connected in parallel with said DC voltage source and having two time constant circuits;

a constant voltage circuit connected in parallel with said astable multivibrator, one common terminal of said parallel arrangement being connected to a terminal of said DC voltage source;

a differential amplifier connected in parallel with said DC voltage source for comparing the output from the filter circuit with a reference voltage and providing two oppositely phased control signals, the differential amplifier being connected to apply said control signals to vary the relative discharge times of said time constant circuits of said astable multivibrator, the other end of said series combination of two transistors being connected to a center tap of said inductor, and the control electrodes of said two transistors of said series combination being connected through respective resistance-capacitance circuits to the output circuits of the astable multivibrator.

* * * * *

UNITED STATES PATENT OFFICE
CERTIFICATE OF CORRECTION

Patent No. 4,210,958　　　　　　Dated July 1, 1980

Inventor(s) Tsuneo Ikenoue, et al

It is certified that error appears in the above-identified patent and that said Letters Patent are hereby corrected as shown below:

In FIG. 4: "DC SOURSE" should be --DC SOURCE--.

In the title page, under "Assignee" information:
  "Tōhoku Ricoh, Ltd." should be --Tōhoku Ricoh Co., Ltd.--.

Signed and Sealed this

Thirtieth Day of December 1980

[SEAL]

Attest:

SIDNEY A. DIAMOND

Attesting Officer　　Commissioner of Patents and Trademarks